United States Patent
Yang et al.

(10) Patent No.: US 9,402,235 B2
(45) Date of Patent: Jul. 26, 2016

(54) NON-COOPERATIVE POWER CONTROL FOR LARGE-SCALE ANTENNA SYSTEMS

(71) Applicant: Alcatel Lucent, Boulogne-Billancourt (FR)

(72) Inventors: Hong Yang, Ledgewood, NJ (US); Thomas Louis Marzetta, Summit, NJ (US)

(73) Assignee: Alcatel Lucent, Boulogne-Billancourt (FR)

( * ) Notice: Subject to any disclaimer, the term of this patent is extended or adjusted under 35 U.S.C. 154(b) by 93 days.

(21) Appl. No.: 14/312,887

(22) Filed: Jun. 24, 2014

(65) Prior Publication Data

US 2015/0373648 A1    Dec. 24, 2015

(51) Int. Cl.
| | |
|---|---|
| *H04B 7/185* | (2006.01) |
| *H04W 52/10* | (2009.01) |
| *H04W 52/14* | (2009.01) |
| *H04W 52/24* | (2009.01) |
| *H04W 52/26* | (2009.01) |
| *H04W 52/34* | (2009.01) |

(52) U.S. Cl.
CPC ............ *H04W 52/10* (2013.01); *H04W 52/143* (2013.01); *H04W 52/146* (2013.01); *H04W 52/241* (2013.01); *H04W 52/267* (2013.01); *H04W 52/346* (2013.01); *H04W 52/24* (2013.01)

(58) Field of Classification Search
CPC . H04W 52/143; H04W 52/08; H04W 52/146; H04W 52/235; H04W 52/26; H04W 52/56; H04W 52/242; H04W 52/245; H04W 52/346; H04W 52/34; H04W 72/085; H04W 52/228
USPC .............. 455/13.4, 69, 127.1–127.5, 455/452.1–452.2, 509, 522; 370/318, 342, 370/336; 713/300, 320, 330, 340
See application file for complete search history.

(56) References Cited

U.S. PATENT DOCUMENTS

| | | | | |
|---|---|---|---|---|
| 5,539,728 | A  * | 7/1996 | Gaiani ................ | H04W 52/143 370/342 |
| 2002/0051433 | A1* | 5/2002 | Affes .................... | H04B 7/086 370/335 |
| 2015/0195019 | A1* | 7/2015 | Nagata ................ | H04B 7/0456 375/267 |

FOREIGN PATENT DOCUMENTS

| | | |
|---|---|---|
| EP | 0 656 716 A1 | 6/1995 |
| EP | 2 280 507 A1 | 2/2011 |
| WO | 2014/021010 A1 | 2/2014 |

OTHER PUBLICATIONS

Larsson, Erik et al, "Massive MIMO for Next Generation Wireless Systems", IEEE Communications Magazine, vol. 52, No. 2, Feb. 2014, pp. 186-195.
PCT International Search Report, 816136-WO-PCT, PCT/US2015/034619, Mailed Sep. 21, 2015, 3 pgs.

* cited by examiner

*Primary Examiner* — Shaima Q Aminzay
(74) *Attorney, Agent, or Firm* — Harness, Dickey & Pierce, P.L.C.

(57) ABSTRACT

A base station servicing a cell of a cellular network provides power control of a cell independent of any other cell in the network. For downlink power control, the base station transmits information at its full power and applies a downlink power control factor to each downlink channel to equalize downlink throughputs of the mobile terminals in the cell. For uplink power control, the base station transmits instructions to have the uplink channel with the worst channel condition to transmit at its full power and the other uplink channels to transmit at that same full power. Each transmission is scaled by a corresponding uplink power control factor such that uplink throughputs for the mobile terminals in the cell are equalized. The base station applies an approximation of a rigorous capacity lower bound algorithm using propagation channel conditions and channel parameters to calculate the uplink and downlink power control factors.

14 Claims, 4 Drawing Sheets

NON-COOPERATIVE POWER CONTROL FOR LARGE-SCALE ANTENNA SYSTEMS

FIELD OF THE INVENTION

The present invention generally relates to power control in communication networks using Large Scale Antenna Systems and in particular to a base station of a cellular network performing power control.

BACKGROUND OF THE INVENTION

A key issue in the proper operation of a cellular communication network is the use of an efficient method for controlling the allocation of power to uplink and downlink channels of a cell being serviced by a base station. Power control, and more particularly, the amount of power allocated to each downlink and uplink transmission by the base station of a cell ultimately goes to the throughput desired by each such channel. Mobile terminals physically located in a cell being serviced by a base station typically require sufficient power to maintain a particular throughput to transmit and/or receive information. Ideally, service providers who own and/or control the cellular networks want to provide uniformly relatively high throughput to the mobile terminals for both the downlink and the uplink of the cells in the network. A Large-Scale Antenna System, as part of base station equipment, due to its relatively superior beam forming capability, can provide relatively high throughput at the various base stations throughout a cellular network by allowing them to cooperate with each other so as to equalize the throughput among all mobile terminals of the network. This approach works best for cases in which each cell serves about the same number of terminals. In a cellular communication network with mobile terminals, the dynamics of mobiles terminals entering and exiting cells and the intrinsic uneven mobile terminal distribution in any given geographic area can result in large differences in the number of mobile terminals served by each cell. It does not make sense to equalize mobile terminal throughput between a crowded cell and a cell with few mobile terminals. Mobile terminals serviced in cells with relatively few mobile terminals should be allowed to have a much higher throughput than the terminals in relatively crowded cells. Higher per mobile throughput in relatively less crowded cells is possible since in the downlink, more power is available per user, and in the uplink, interference rise at the base station receiver is lower.

BRIEF SUMMARY OF THE INVENTION

The present invention provides a power control method by a base station equipped with a Large Scale Antenna System (LSAS)—also called Massive MIMO (Multiple Input Multiple Output)—servicing a cell within which one or more mobile terminals are located. The cell and base station are part of a cellular communication network. The terminology of a base station servicing a cell refers to the base station equipment coordinating and controlling the communications of the mobile terminals physically located in the cell; this is usually done in accordance with various protocols of one or more communication standards being followed by the cellular communication network. The method of the present invention is a non-cooperative method in that each base station applies the method independently without any cooperation from any other base station of the communication network.

For controlling the power allocation on the downlink, the base station first calculates a downlink power control factor for each of its current downlink channels based on an approximation of a rigorous capacity lower bound algorithm. The downlink channels have throughput requirements defining the throughput at which each such channel desires to receive information from the base station; the throughput requirements of a downlink channel may be dictated by the throughput requirements of a mobile terminal or terminals coupled to such downlink channel. The base station then transmits, at full power, information over its downlink (to intended mobile terminals) applying the various calculated downlink power control factors to the transmission whereby each such downlink power control factor controls the amount of power transmitted over each of the downlink channels. Each of the downlink channels thus receives a scaled value of the full power transmission of the base station based on the downlink power control factor calculated for that downlink channel. The calculated downlink power control factors causes each of the corresponding downlink channels to have relatively equal throughputs with respect to each other.

For power control of the uplink, the base station calculates an uplink power control factor for each of its current uplink channels based on an approximation of a rigorous capacity lower bound algorithm. The uplink channels have throughput requirements that define the throughput at which each of the channels desires to transmit information to the base station; the throughput requirements of an uplink channel may be dictated by the throughput requirements of a mobile terminal or terminals coupled to such downlink channel. The base station then transmits a calculated uplink power control factor over each of its downlink channels in the cell. During the next transmission, the power level of each transmission of the uplink channels is scaled by the uplink power control factor calculated for each uplink channel. The calculated uplink power control factors cause uplink channels (and thus the mobile terminals coupled thereto) to have relatively equal throughputs with respect to each other.

DETAILED DESCRIPTION

Figure 1:
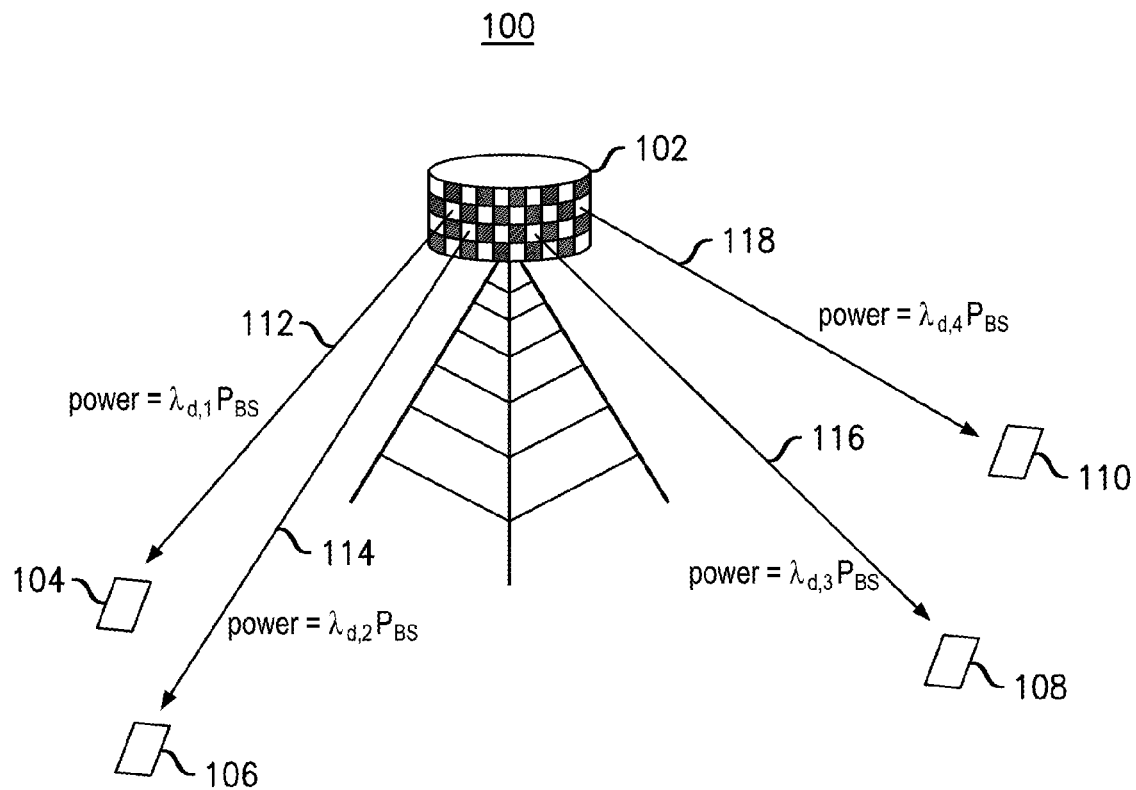
FIG. 1 shows a portion of a cellular communication network comprising a base station having an LSAS servicing a plurality of mobile terminals on the downlink.

The present invention provides a power control method by a base station equipped with a Large Scale Antenna System (LSAS)—also called Massive MIMO (Multiple Input Multiple Output)—servicing a cell within which one or more mobile terminals are located. The cell and base station are part of a cellular communication network. The terminology of a base station servicing a cell refers to the base station equipment coordinating and controlling the communications of the mobile terminals physically located in the cell; this is usually done in accordance with various protocols of one or more communication standards being followed by the cellular communication network. The method of the present invention is a non-cooperative method in that each base station applies the method independently without any cooperation from any other base station of the communication network.

For controlling the power allocation on the downlink, the base station first calculates a downlink power control factor for each of its current downlink channels based on an approximation of a rigorous capacity lower bound algorithm. The downlink channels have throughput requirements defining the throughput at which each such channel desires to receive information from the base station; the throughput requirements of a downlink channel may be dictated by the throughput requirements of a mobile terminal or terminals coupled to such downlink channel. The base station then transmits, at full power, information over its downlink (to intended mobile terminals) applying the various calculated downlink power control factors to the transmission whereby each such downlink power control factor controls the amount of power transmitted over each of the downlink channels. Each of the downlink channels thus receives a scaled value of the full power transmission of the base station based on the downlink power control factor calculated for that downlink channel. The calculated downlink power control factors causes each of the corresponding downlink channels to have relatively equal throughputs with respect to each other.

For power control of the uplink, the base station calculates an uplink power control factor for each of its current uplink channels based on an approximation of a rigorous capacity lower bound algorithm. The uplink channels have throughput requirements that define the throughput at which each of the channels desires to transmit information to the base station; the throughput requirements of an uplink channel may be dictated by the throughput requirements of a mobile terminal or terminals coupled to such downlink channel. The base station then transmits a calculated uplink power control factor over each of its downlink channels in the cell. During the next transmission, the power level of each transmission of the uplink channels is scaled by the uplink power control factor calculated for each uplink channel. The calculated uplink power control factors cause uplink channels (and thus the mobile terminals coupled thereto) to have relatively equal throughputs with respect to each other. The term "scaled" as used herein refers to the multiplication of the power value (e.g., full power) at which transmission is performed by a corresponding power control factor (uplink or downlink) thus scaling the power level.

Referring to FIG. 1 a portion of the cellular network within which the method of the present invention is performed is shown. Base station 102, comprising an LSAS and other equipment, is shown transmitting information simultaneously over four (4) of its downlink channel, 112, 114, 116, and 118 to be received by four (4) corresponding mobile terminals 104, 106, 108 and 110. The LSAS comprises M antenna elements where M is an integer equal to 2 or greater. Base station 102 is transmitting at its full power, $P_{BS}$, with a corresponding power control factor, $\lambda$, applied to each downlink channel. A downlink channel refers to a beam formed from a signal originating from one or more antenna element where the beam is spatially directed to a desired location within the cell where a mobile terminal may be located and for which the transmission may be intended. The downlink channel may exist without being directed to any mobile terminals. The base station 102 and its associated equipment control the operation and generation of such beam. Each mobile terminal receives information over a similarly formed downlink channel. A downlink power control factor, $\lambda_{d,k}$, represents the downlink (d) power scaling factor for a downlink channel to which a mobile k, where k=1, 2, 3, . . . , K may be coupled; K and k are integers equal to 1 or greater. Each of the downlink channels 112, 114, 116 and 118 and thus each the corresponding coupled mobile terminals 104, 106, 108 and 110 has its particular throughput requirement and desires to receive information at a power level that will allow it to meet that throughput requirement. Thus, the throughput requirements are directly related to the power requirements of the respective channels and maybe directly related to the throughput requirements of the mobile or mobiles to which information is being transmitted. In the example shown in FIG. 1, the full downlink power, $P_{BS}$, is shared by 4 mobile terminals requiring the downlink power control factors to obey the constraint $\lambda_{d,1}+\lambda_{d,2}+\lambda_{d,3}+\lambda_{d,4} \leq 1$. The method of the present invention specifies the manner of determining the downlink power control factors $\lambda_{d,k}$ k=1, . . . , K for each downlink channel or mobile (or both) in each cell independently of the power control performed in any other cell of the cellular communication network. An approximation of a rigorous capacity lower bound algorithm (to be discussed infra) calculates the downlink power control factors for downlink channel (or mobile or both) such that the downlink channel (or mobiles or both) receive information over the downlink at relatively equal throughputs. In FIG. 1, the information is transmitted at full base station power scaled by the respective downlink power control factors. Thus, each downlink channel (and thus each mobile terminal) is receiving information not at full base station power, but at a power that is a scaled version of the full base station power, $P_{BS}$; the scaling factor being the downlink power control factor for that downlink channel (or mobile coupled thereto). The full power, $P_{BS}$, represents the maximum power at which the base station 102 can transmit given its current set of antennas, power source, radio transmitter, receiver, processor and other circuitry constituting the base station 102. A different set of equipment and/or circuitry for the base station may provide a different maximum power value.

Figure 2:
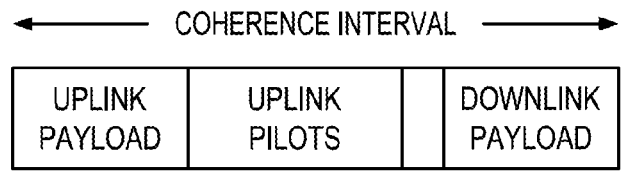
FIG. 2 is a coherence interval time period that provides the protocol dictating when the base station receives information, receives pilot signals and transmits information.

Referring to FIG. 2, a defined time period referred to as the coherence interval is shown, which is a format used to define different periods of time during which different types of wireless transmissions and receptions of information by a base station occur. The coherence interval shown in FIG. 2 has a first time period during which uplink payload (also called 'reverse data') is received by the base station. Typically, the uplink payload originates from one or more mobile terminals physically located in the cell that the base station is servicing. Thus, uplink payload typically refers to information received by the base station from the different mobile terminals. Typically, the mobile terminals use channel state information (CSI) to pre-process their information prior to transmission. The CSI is information that reflects the characteristics of the channel through which the uplink transmission is done. A more detailed description of uplink transmissions and how the method of the present invention applies power control to uplink transmissions is discussed infra with respect to FIG. 3.

Continuing with FIG. 2, the next time period in the coherence interval is reserved for the transmission of pilot signals over the uplink, i.e., uplink pilots, from the various mobile terminals located in the cell. Typically the uplink pilot signals (also referred to as 'reverse pilots' belong to a set of orthogonal pilot signals, which are transmitted at a defined time instance (network defined or defined in accordance with a protocol) from each mobile terminal to the base station. The uplink pilot signals themselves are also defined by a standard and/or the network. Having a priori knowledge of the characteristics (e.g., amplitude, frequency content, and relative phase) of the pilot signals, the base station can determine the characteristics of the uplink channels that the pilot signals have traversed based on the alterations experienced by the pilot signals. An uplink channel refers to a signal or group of signals (typically transmitted by one or more mobile terminals in the cell) that can be received by a base station servicing a cell of the cellular communication network. The altered characteristics of the pilot signals allow the base station to calculate and/or derive the Channel State Information (CSI) for the different uplink channels through which the pilot signals were transmitted. In uplink transmissions of information, the mobile terminals can pre-process their transmissions by applying the base station derived CSI to the transmissions to reduce the adverse effects of the uplink channels. Further, it is well known that the uplink CSI is essentially the same as the downlink CSI and thus the base station can pre-process its downlink transmissions in accordance with the CSI it derived from the uplink pilot signals to improve the robustness of the downlink signals and reduce the adverse effects typically experienced by the downlink signals. The number of pilot signals in the set of pilot signals may be less than the number of mobile terminals being serviced at any particular time by the base station. In such circumstances, a certain number of the pilot signals are re-used violating the complete orthogonal nature of the set of pilot signals. In particular, pilot signal re-use causes pilot signal contamination, which essentially is interference between non-orthogonal pilot signals. As a result of pilot contamination, the quality and throughput of information transmitted over the downlink and uplink may be adversely affected. The pilot signals are also used to calculate or derive (or both) propagation channel conditions, which reflect and represent slow fading channel characteristics as will be discussed infra.

Still continuing with FIG. 2, the last portion of the coherence time interval defines a period for transmitting downlink payloads (also called 'forward data') over the downlink. Information (including downlink payload) is transmitted by the base station over the various downlink channels (to mobile terminals coupled to such channels, for example) located in the cell being serviced by the base station. As already discussed with respect to FIG. 1, supra, each of the downlink transmissions received by each of the mobile terminals in the cell of the base station is scaled as per the downlink power control factors based on an approximation of a rigorous capacity lower bound algorithm. With the use of this algorithm, the resulting throughputs of each of the downlink channels (or the mobile terminals coupled thereto) are relatively equal to each other.

Figure 3:
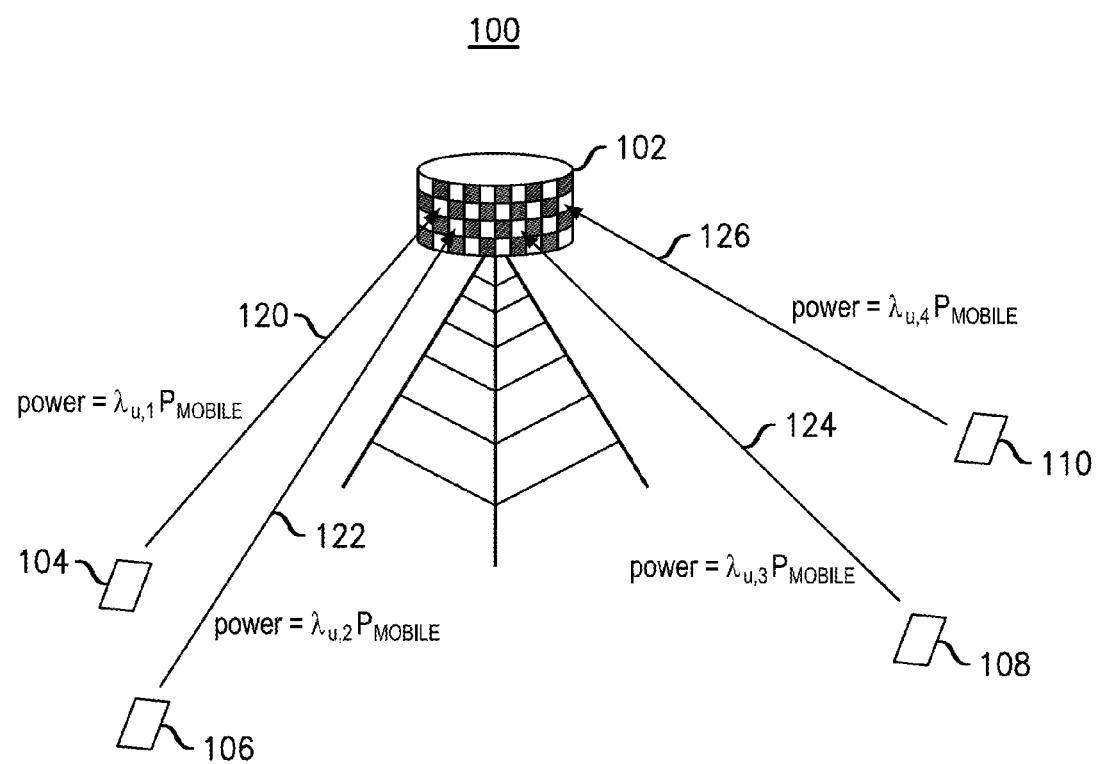
FIG. 3 shows a portion of a cellular communication network comprising a base station having an LSAS servicing a plurality of mobile terminals on the uplink.

Referring now to FIG. 3, the same portion of the cellular network shown in FIG. 1 is now shown with the mobile terminals 104, 106, 108 and 110 transmitting information over the corresponding uplink channels (120, 122, 124 and 126) to the base station 102. Prior to the transmission of information by the mobile terminals, base station 102 selected a downlink channel (or a mobile coupled thereto) in its cell and transmitted a command to that mobile coupled to the channel to transmit information at full power, $P_{MOBILE}$. Further, the base station calculated the uplink power control factor for each of the uplink channels (or mobiles coupled thereto) and instructed each mobile (including the selected mobile) to apply its uplink power control factor to its transmission. One approach that may be used by the base station in selecting a particular mobile to allow that mobile to transmit at its full power is to analyze the quality of the pilot signals received from such a mobile during the reverse pilot period discussed with respect to FIG. 2 supra. The mobile terminal whose pilot signals were most adversely affected by the uplink channel conditions is the mobile that is allowed to transmit at full power. In other words, the uplink channels having the worst channel conditions is selected by the base station and is allowed to transmit at its full power. Certainly, criteria other than the ones mentioned herein, can be used by the base station to select the mobile/uplink channel that is to transmit information at full power. From the standpoint of throughput requirements, it stands to reason that the mobile with the worst uplink channel (based on analysis of received pilot signals, for example) would need to transmit its signals with the most amount of available power.

As can be seen in FIG. 3 the power of each uplink transmission is scaled as per the uplink power control factor, $\lambda$, where $\lambda_{u,k}$ represents the uplink (u) power control factor of the $k^{th}$ mobile. The uplink power control factors obey the constraints $\lambda_{u,1} \leq 1$ and $\lambda_{u,2} \leq 1$ and $\lambda_{u,3} \leq 1$ and $\lambda_{u,4} \leq 1$. The method of the present invention specifies the manner of determining the uplink power control factors $\lambda_{u,k}$ k=1, ..., K; k and K are integers equal to 1 or greater. For each mobile in each cell, the power control factors are calculated independently of the power control performed in any other cell of the cellular communication network. Thus, each mobile terminal transmits information at a power that is a scaled version of the full power $P_{MOBILE}$ of the selected mobile; the scaling factor being the uplink power control factor for the transmitting mobile. Each of the mobile terminals 104, 106, 108 and 110 has its particular throughput requirement and desires to transmit information at a power level that will allow it to meet its desired throughput. Thus, the throughput requirements are directly related to the power requirements of the respective mobiles from which information is being transmitted. In FIG. 3, the information is transmitted at a full power of one of the mobiles scaled by the respective uplink power control factors. The full power, $P_{MOBILE}$, represents the maximum power at which the selected mobile terminal can transmit given its current set of antennas, battery capacity, radio transmitter, receiver, processor and other circuitry constituting the mobile terminal. A different set of equipment and/or circuitry for the same mobile terminal may provide a different maximum power value. The rigorous capacity lower bound algorithm to be discussed infra with respect to FIGS. 4 and 5 causes the mobile terminals to transmit information at relatively equal throughputs with respect to each other.

Figure 4:
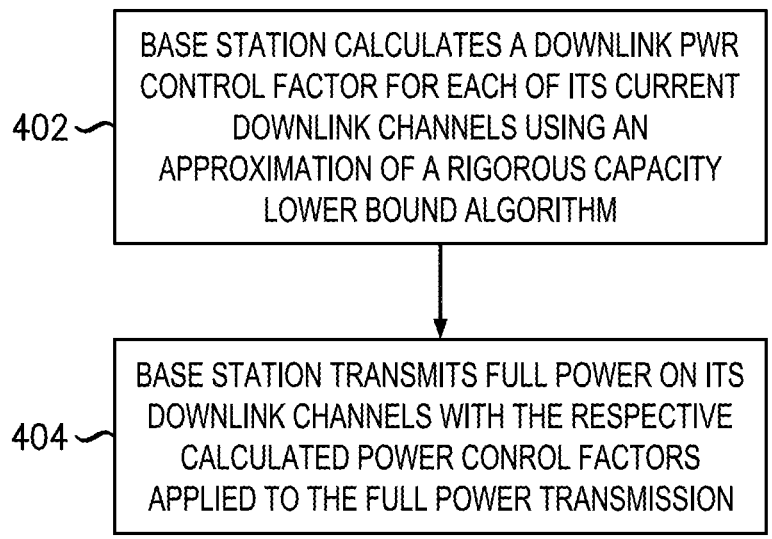
FIG. 4 depicts one embodiment of the method of the present invention for downlink power control.

Referring now to FIG. 4 wherein a flow chart of an embodiment of the method of the present invention for power control over the downlink is shown. For the sake of clarity and ease of explanation the method for downlink power control will be discussed not only with respect to FIG. 4, but the discussion will also, at times, refer to FIG. 1.

In step 402, for the current transmission, the base station 102 (of FIG. 1) calculates a downlink power control factor for each of its current downlink channels using an approximation of a rigorous capacity lower bound algorithm. Step 402 calculates $\lambda_{d,k}$ (i.e., downlink power control factors) using various downlink channel conditions and channel parameters (discussed infra) for open loop power control. Open loop power control refers to the calculation of the downlink power control factors without taking into account the effects of pilot contamination from a previous transmission. In step 402, the downlink power control factors can be calculated taking into account the effects of pilot contamination; this is done by considering the effects of the SINR (Signal to Interference Noise Ratio—due to pilot contamination) from an immediately prior transmission (or a previous transmission not necessarily an immediately prior transmission) by the base station. For a first transmission, the downlink power control factor is calculated and that value is used along with the SINR (Signal to Interference Noise Ratio) from the first transmission to calculate the downlink power control factor for an ensuing transmission. The calculated downlink power control factor for the ensuing transmission (in which the SINR from a previous transmission and the downlink power control factor from that previous transmission are used) is the closed loop downlink power control factor. For ease of explanation, the downlink open loop power control factor is denoted as $\lambda_{d,ol,k}$, and the downlink closed loop power control factor is denoted as $\lambda_{d,cl,k}$. The approximation used for the rigorous capacity lower bound algorithm generates a relatively highest, but equalized throughput for the mobile terminals coupled to the downlink channels. This algorithm is thus a fair algorithm in that it allows equal throughput (for uplink and downlink) for the mobile terminals coupled to the downlink channels and which are being serviced by the base station or at least for a significant percentage of the population of mobile terminals being serviced by the base station.

Continuing with FIG. 4, a base station 102 as shown in FIGS. 1 and 3 is servicing K mobile terminals and is equipped with, inter alia, an LSAS. The LSAS has M antennas or antenna elements. The base station 102 uses the time duration (or length) $\tau_u$ of the pilot signals, the uplink normalized SNR (Signal to Noise Ratio) $\rho_u$, the normalized mobile received power, $\beta_{mobile,k}$, and the slow fading channel coefficient $\beta_k$ associated with mobile k calculate the open loop downlink power control factor, $\lambda_{d,ol,k}$, as follows:

$$\lambda_{d,ol,k} = \frac{\rho_{mobile,k}(1+\tau_u\rho_u\beta_k)\beta_k^{-2}}{\sum_{l=1}^{K}\rho_{mobile,l}(1+\tau_u\rho_u\beta_l)\beta_l^{-2}}, k=1,\ldots,K.$$

The term "fading" as it relates to uplink and downlink power control refers to variations in signal characteristics (e.g., varying amplitude or phase) due to different components of the signal arriving at their destination point at different times and thus adding constructively or destructively; the signal components are said to take different paths or multipaths. The term "slow fading" refers to relatively slow variations in the signal characteristics whereby very little or no significant changes occur in the signal characteristics for at least several wavelengths of the signal. As discussed above, the term "open loop" refers to the situation where the effects of pilot contamination are not considered. However, when the effects of pilot contamination are considered, the downlink power control factor becomes a closed loop power control and the expression for the power control of the $k^{th}$ mobile is as follows:

$$\lambda_{d,cl,k} = \frac{\lambda_{d,k,0}/SINR_{mobile,k,0}}{\sum_{l=1}^{K}\lambda_{d,l,0}/SINR_{mobile,l,0}},$$

$k=1,\ldots,K$, where the effective $SINR_{mobile,k,0}$ (Signal to Interference Noise Ratio of mobile k from a previous transmission) and calculated power control factor $\lambda_{d,k,0}$ from a previous transmission for the $k^{th}$ mobile are fed back to the base station to take into account the effects of pilot contamination thus adjusting the calculation of the downlink power control factor. The previous transmission can be an immediate prior transmission. Base station 102 calculates a downlink power control factor as per the above equations for each of the mobiles in the cell using propagation channel conditions (to be discussed infra) and the downlink channel parameters mentioned above. The channel parameters (i.e., uplink channel parameters) are measured channel characteristics or derived channel characteristics (e.g., characteristics derived from pilot signals) or both. The characteristics describe the frequency, amplitude, phase and other variables of a signal or a group of signals. In step 404, base station 102 then transmits information to the various mobile terminals at full power applying the proper downlink power control factor for each of the mobile terminals shown in FIG. 1. Each channel associated with a mobile terminal has its power adjusted by the downlink power control factor for that mobile.

Figure 5:
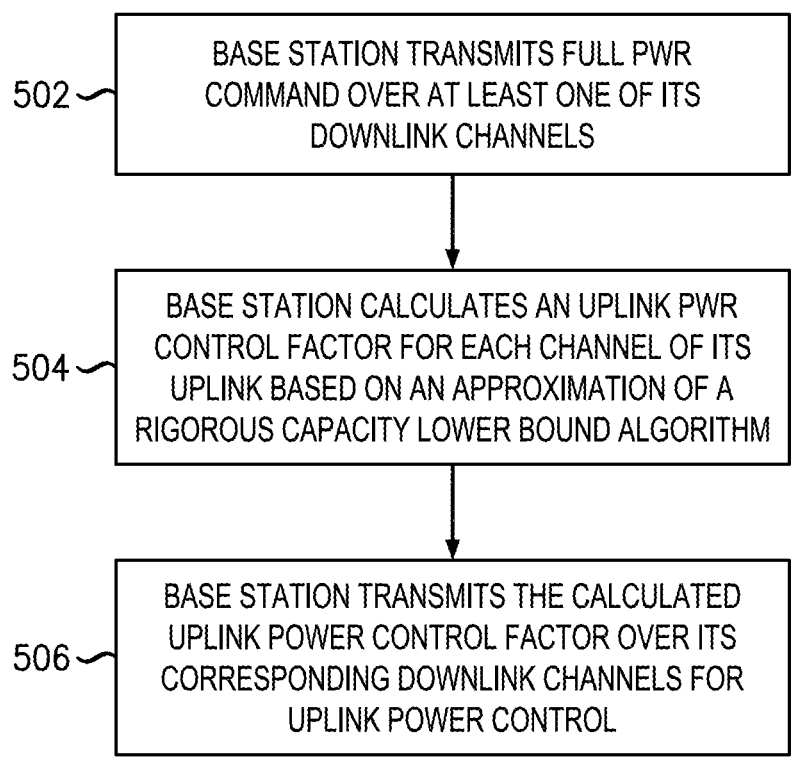
FIG. 5 depicts one embodiment of the method of the present invention for uplink power control.

Referring now to FIG. 5, the method of the present invention for power control over the uplink is discussed. For the sake of clarity and ease of explanation the method for uplink power control will be discussed not only with respect to FIG. 5, but the discussion will also, at times, refer to FIG. 3.

In step 502, base station 102 of FIG. 3 transmits a command over one of its downlink channels (i.e., to one of the mobile terminals in the cell) in the cell instructing a mobile terminal to transmit at its full power at the next uplink transmission period (i.e., the uplink payload portion of the coherence interval—see FIG. 2). Base station 102 also transmits the command over the other downlink channels instructing the other terminals to transmit at that same power level (i.e., full power of the selected terminal) during their next uplink transmission. Prior to transmitting such a command, the base station received pilot signals from each of the mobile terminals in the cell and determined which of the terminals has the most adverse propagation channel condition and/or is located the furthest from the base station and selects that terminal based on one or both of these criteria. The base station 102 is not limited to using the two mentioned criteria to select the mobile; the base station 102 can use other criteria to select the mobile terminal that is to transmit information at full power. Generally, the base station 102 will select the mobile terminal with the most problematic propagation channel condition. Various propagation channel conditions of the uplink can be derived by the base station from the reverse pilot signals transmitted by the mobile terminals during the time designated by the coherence interval. Propagation channel conditions (or RF channel conditions) refer to slow fading channel conditions or slow fading channel coefficients or both.

In step 504, the same type of information (e.g., propagation channel conditions, uplink channel parameters) used to calculate the downlink power control factors are also used for the calculation of the uplink power control factors. An open loop uplink power control factor for the $k^{th}$ mobile for the next transmission is calculated as follows:

$$\lambda_{u,ol,k}=(1+\tau_u\rho_u\beta_k)\beta_k^{-2}/\phi_{ol}, k=1,\ldots,K, \text{ where}$$
$$\phi_{ol}=\max\{(1+\tau_u\rho_u\beta_l)\beta_l^{-2}, l=1,\ldots,K\}.$$

The closed loop uplink power control is calculated as follows:

$$\lambda_{u,cl,k} = \frac{\phi_{cl}(M-1+SINR_{BS,k,0})\lambda_{u,k,0}}{(M-1)SINR_{BS,k,0}},$$

$k=1,\ldots,$ where $$\phi_{cl} = \min\left\{\frac{(M-1)SINR_{BS,l,0}}{(M-1+SINR_{BS,l,0})\lambda_{u,l,0}}, l=1,\ldots,K\right\};$$

the uplink effective $SINR_{BS,k,0}$ and power control factor $\lambda_{u,k,0}$, which are calculations and/or measurements from the previous uplink transmission by the corresponding mobile terminal are now fed back to the mobile terminal and are used to calculate the uplink power control factor for the next uplink transmission as shown above. As described previously, M represents the number of antennas or antenna elements of the LSAS of base station 102 of FIG. 3, for example. M is an integer equal to 2 or greater.

In step 506, base station 102 of FIG. 3 transmits the calculated uplink power control factors to the corresponding mobile terminals. During the next uplink transmission the mobile terminals each transmit at a power equal to the full power of the selected mobile scaled by their corresponding uplink power control factor received from the base station as shown in FIG. 3. The approximation of the rigorous capacity lower bound algorithm causes the uplink throughput of the mobile terminals to be relatively equal to each other.

For both the downlink and uplink power control factors, the approximation to a rigorous capacity lower bound algorithm can use an open loop calculation or a closed loop calculation. Also, for one embodiment of the present invention, for both the downlink and the uplink, the corresponding power control factors are calculated using the propagation channel conditions and channel parameters associated with slow fading characteristics.

An example of the performance of the method of the present invention is now discussed with reference to the tables below. Each cell of a cellular communication network using LSAS has a radius of 500 meters. Each base station is equipped with 64 service antennas. The total available radiated power is 1 W. Each mobile terminal has a transmit power of 200 mW. Each cell on the average serves 18 mobile terminals with mobility up to 71 km/hr. The total bandwidth for both downlink and uplink transmissions is 20 MHz at 1.9 GHz carrier frequency. The following tables summarize the performance of the method of the present invention compared to an existing power control method.

| Downlink | | | | |
|---|---|---|---|---|
| | | Existing PC | Open-loop PC | Closed-loop PC |
| Average Spectral Efficiency/cell | | 8.48 | 12.2 | 11.9 |
| Terminals with throughput (Mbps) | $5^{th}$ | 4.09 | 5.00 | 4.86 |
| | $50^{th}$ | 5.03 | 6.99 | 6.81 |
| Terminals with Min. user throughput (Mbps) | $5^{th}$ | 4.09 | 3.65 | 4.79 |
| | $50^{th}$ | 5.03 | 6.27 | 6.88 |
| Total Cell throughput (Mbps) | $5^{th}$ | 56.29 | 94.16 | 89.31 |
| | $50^{th}$ | 84.01 | 121.65 | 118.80 |

| Uplink | | | | |
|---|---|---|---|---|
| | | Existing PC | Open-loop PC | Closed-loop PC |
| Average Spectral Efficiency/cell | | 5.40 | 11.3 | 10.8 |
| Terminals with throughput (Mbps) | $5^{th}$ | 1.75 | 3.95 | 3.30 |
| | $50^{th}$ | 3.30 | 6.56 | 6.29 |
| Cells with Min. Terminal throughput (Mbps) | $5^{th}$ | 1.75 | 2.64 | 3.31 |
| | $50^{th}$ | 3.30 | 5.78 | 6.40 |
| Total Cell throughput (Mbps) | $5^{th}$ | 26.49 | 67.42 | 56.12 |
| | $50^{th}$ | 53.49 | 112.58 | 107.89 |

The above tables show the throughput results for Open Loop Power Control (Open-Loop PC), Closed Loop Power Control (Closed-Loop PC) and Existing Power Control (Existing PC) for the uplink and downlink. The Existing PC represents a current power control approach that also equalizes user throughput of an entire network. The "$5^{th}$" and "$50^{th}$" labels denote $5^{th}$ percentile and $50^{th}$ percentile values.

The row "Terminals with throughput (Mbps)" denotes the throughput (in Mbps) per Terminal in the entire network. The row "Cells with Min. Terminals throughput (Mbps)" denotes the minimum throughput (in Mbps) per Terminal in each cell in the network, and the row "Cell throughput (Mbps)" is the total throughput from each cell in the network. For example, looking at the last column of the "Downlink" table above, we see from row "Terminals with throughput (Mbps)" that using "Closed-Loop" PC, 95% of the terminals have a downlink throughput of 4.86 Mbps or higher and 50% of the users have a downlink throughput of 6.81 Mbps or higher. The row "Cells with Min. user throughput (Mbps)" shows that 95% of the cells have a minimum downlink throughput per user of 4.79 Mbps or higher and 50% of the cells have a downlink throughput of 6.88 Mbps or higher. The row "Total Cell throughput (Mbps)" shows that 95% of the cells have a total cell downlink throughput of 89.31 Mbps or higher and 50% of the cells have a total cell downlink throughput of 118.80 Mbps or higher.

While various aspects of the invention have been described above, it should be understood that they have been presented by way of example and not by limitation. It will be apparent to persons skilled in the relevant art(s) that various changes in form and detail can be made herein without departing from the spirit and scope of the present invention. Thus, the present invention should not be limited by any of the above-described exemplary aspects, but should be defined only in accordance with the following claims and their equivalents.

What is claimed is:

1. A method comprising:
transmitting, by a base station servicing a cell of a cellular communication network, information over one or more downlink channels of the cell, the base station transmitting the information at full power scaled by a downlink power control factor for each of the downlink channels, each of the downlink power control factors being calculated by the base station using an open loop power control factor calculation in which propagation channel conditions and channel parameters of each corresponding downlink channel is applied to an approximation of a rigorous capacity lower bound algorithm, the transmission being performed by the base station independent of any other cell of the cellular communication network, the calculation for the open loop downlink power control factor for a $k^{th}$ mobile terminal being based on $$\frac{\rho_{mobile,k}(1+\tau_u\rho_u\beta_k)\beta_k^{-2}}{\sum_{l=1}^{K}\rho_{mobile,l}(1+\tau_u\rho_u\beta_l)\beta_l^{-2}}$$

with k=1, ..., K in which,
k and K are integers equal to or greater than 2,
$\rho_{mobile,k}$ is a normalized received power for the $k^{th}$ mobile terminal,
$\rho_{mobile,l}$ is a normalized received power for an $l^{th}$ mobile,
$\rho_u$ is an uplink normalized SNR,
$\beta_k$ is a slow fading coefficient for the kth mobile,
$\beta_l$ is a slow fading coefficient for an $l^{th}$ mobile, and
$\tau_u$ represents a duration of a pilot signal.

2. The method of claim 1, wherein the downlink power control factors add to a sum equal to 1 or less.

3. The method of claim 1, wherein the base station has an LSAS comprising M antenna elements where M is an integer equal to 2 or greater.

4. A method comprising:
transmitting, by a base station servicing a cell of a cellular communication network, uplink power control factors over each of one or more downlink channels of the cell for corresponding uplink channels, the uplink power control factors being calculated by the base station using an open loop uplink power control factor calculation and propagation channel conditions and channel parameters of each of the corresponding uplink channels, the transmission of the uplink power control factors by the base station being performed independent of any other cell of the cellular communication network, the calculation for the open loop uplink power control factor for a $k^{th}$ mobile terminal being based on $(1+\rho_u\rho_u\beta_l)\beta_k^{-2}/\phi_{ol}$ with k=1, ..., K, in which, k and K are integers equal to or greater 2, $\phi_{ol} = \max\{(1+\tau_u\rho_u\beta_l)\beta_l^{-2}, l=1, ..., K\}$, a normalized received power for the $k^{th}$ mobile terminal, $\rho_{mobile,l}$ is a normalized received power for an $l^{th}$ mobile, $\beta_k$ is a slow fading coefficient for the $k^{th}$ mobile, $\beta_l$ is a slow fading coefficient for an $l^{th}$ mobile, and $\rho_u$ represents a duration of a pilot signal; and receiving, by the base station, information from the uplink channels all of which transmit information at a full power of one of the uplink channels scaled by the corresponding calculated uplink power control factors.

5. The method of claim 4, wherein the transmitting by the base station transmits a command over the downlink channels instructing the uplink channels to transmit information at a full power of one of the uplink channels.

6. The method of claim 4, wherein the base station applies the propagation channel conditions and channel parameters to an approximation of a rigorous capacity lower bound algorithm to calculate the uplink power control factors.

7. The method of claim 4, wherein each of the calculated uplink power control factors is less than or equal to 1.

8. A method comprising:
transmitting, by a base station servicing a cell of a cellular communication network, information over one or more downlink channels of the cell, the base station transmitting the information at full power scaled by a downlink power control factor for each of the downlink channels, each of the downlink power control factors being calculated by the base station using a closed loop downlink power control calculation in which propagation channel conditions and channel parameters of each corresponding downlink channel is applied to an approximation of a rigorous capacity lower bound algorithm, the transmission being performed by the base station independent of any other cell of the cellular communication network, the calculation for the closed downlink power control factors for a kth mobile being based on $$\frac{\lambda_{d,k,0} / SINR_{mobile,k,0}}{\sum_{l=1}^{K} \lambda_{d,l,0} / SINR_{mobile,l,0}}$$

with k=1, ..., K in which,
k and K are integers equal to or greater than 2,
$SINR_{mobile,k,0}$ and $SINR_{mobile,l,0}$ are the Signal to Interference Ratio for a $k^{th}$ and an $l^{th}$ mobile respectively, and $\lambda_{d,k,0}$, and $\lambda_{d,l,0}$ are downlink power control factors from a previous transmission for a $k^{th}$ and an $l^{th}$ mobile terminal respectively.

9. The method of claim 8, wherein the downlink power control factors add to a sum equal to 1 or less.

10. The method of claim 8, wherein the base station has an LSAS comprising M antenna elements where M is an integer equal to 2 or greater.

11. A method comprising:
transmitting, by a base station servicing a cell of a cellular communication network, uplink power control factors over each of one or more downlink channels of the cell for corresponding uplink channels, the uplink power control factors being calculated by the base station using a closed loop uplink power control factor calculation and propagation channel conditions and channel parameters of each of the corresponding uplink channels, the transmission of the uplink power control factors by the base station being performed independent of any other cell of the cellular communication network, the calculation for the closed loop uplink power control factor for a $k^{th}$ mobile terminal being based on $$\frac{\phi_{cl}(M - 1 + SINR_{BS,k,0})\lambda_{u,k,0}}{(M - 1)SINR_{BS,k,0}}$$

with k=1, ..., K in which,
k and K where $$\phi_{cl} = \min\left\{\frac{(M - 1)SINR_{BS,l,0}}{(M - 1 + SINR_{BS,l,0})\lambda_{u,l,0}}, l = 1, ..., K\right\}$$

are integers equal to or greater than 2,
$\rho_{mobile,k}$ is a normalized received power for the $k^{th}$ mobile terminal,
$\rho_{mobile,l}$ is a normalized received power for an $l^{th}$ mobile,
$\beta_k$ is a slow fading coefficient for the $k^{th}$ mobile,
$\beta_l$ is a slow fading coefficient for an $l^{th}$ mobile,
$\rho_u$ represents a duration of a pilot signal,
$SINR_{BS,l,0}$ is signal to interference noise ratio measured at the base station for a previous transmission,
$\lambda_{u,l,0}$ is a calculated uplink power control factor for an $l^{th}$ mobile for a previous transmission and
M represents a number of antenna elements of an LSAS of the base station where M is an integer equal to 2 or greater; and receiving, by the base station, information from the uplink channels all of which transmit information at a full power of one of the uplink channels scaled by the corresponding calculated uplink power control factors.

12. The method of claim 11, wherein the transmitting by the base station transmits a command over the downlink channels instructing the uplink channels to transmit information at a full power of one of the uplink channels.

13. The method of claim 11, wherein the base station applies the propagation channel conditions and channel parameters to an approximation of a rigorous capacity lower bound algorithm to calculate the uplink power control factors.

14. The method of claim 11, wherein each of the calculated uplink power control factors is less than or equal to 1.

* * * * *